(12) United States Patent
Okamoto

(10) Patent No.: US 12,038,348 B1
(45) Date of Patent: Jul. 16, 2024

(54) VEHICLE COMPONENT MONITORING

(71) Applicant: Zoox, Inc., Foster City, CA (US)

(72) Inventor: Kazuhide Okamoto, San Mateo, CA (US)

(73) Assignee: Zoox, Inc., Foster City, CA (US)

( * ) Notice: Subject to any disclaimer, the term of this patent is extended or adjusted under 35 U.S.C. 154(b) by 409 days.

(21) Appl. No.: 17/363,913

(22) Filed: Jun. 30, 2021

(51) Int. Cl.
G01M 17/02 (2006.01)
B60C 11/24 (2006.01)
B60W 60/00 (2020.01)
G06N 20/00 (2019.01)
G06T 7/50 (2017.01)
G07C 5/00 (2006.01)

(52) U.S. Cl.
CPC ......... G01M 17/027 (2013.01); B60C 11/246 (2013.01); B60W 60/0018 (2020.02); G06N 20/00 (2019.01); G06T 7/50 (2017.01); G07C 5/006 (2013.01); G07C 5/008 (2013.01); B60W 2420/403 (2013.01); G06T 2207/30248 (2013.01)

(58) Field of Classification Search
CPC .................. G01M 17/027; G06T 7/50; G06T 2207/30248; G06N 20/00; B60W 60/0018; B60W 2420/42; B60C 11/246; G06C 5/006; G06C 5/008

USPC ......................................................... 701/34
See application file for complete search history.

(56) References Cited

U.S. PATENT DOCUMENTS

| | | | |
|---|---|---|---|
| 11,099,561 B1* | 8/2021 | Kentley-Klay | G01C 21/32 |
| 2020/0130420 A1* | 4/2020 | Puranik | B60R 11/04 |
| 2020/0189326 A1* | 6/2020 | Sethi | B60C 23/0486 |
| 2020/0216085 A1* | 7/2020 | Bobier-Tiu | B60W 40/08 |
| 2021/0181737 A1* | 6/2021 | Patnaik | G05D 1/0055 |
| 2021/0224971 A1* | 7/2021 | Levin | G06T 7/0004 |
| 2021/0326763 A1* | 10/2021 | Bernat | G06N 20/00 |
| 2022/0024494 A1* | 1/2022 | Bonanni | B60W 60/00256 |

* cited by examiner

Primary Examiner — Yazan A Soofi
(74) Attorney, Agent, or Firm — Lee & Hayes, P.C.

(57) ABSTRACT

Techniques for determining a condition of a component of a vehicle and/or adjusting a configuration of a vehicle based on a condition of a component of the vehicle are discussed herein. The vehicle can receive vehicle component data and use the vehicle component data to determine a condition of one or more vehicle components. The vehicle can use a sensor, such as an image sensor, to capture or otherwise determine the vehicle component data. The condition of the component(s) of the vehicle may be determined using a machine learned model trained to determine condition of the component from image data. The vehicle can determine vehicle configuration data based on the condition. The vehicle configuration data may include an instruction to navigate to a maintenance facility, to remove the vehicle from service, constraining operation of the vehicle, etc.

20 Claims, 6 Drawing Sheets

VEHICLE COMPONENT MONITORING

BACKGROUND

Vehicle parts and/or components in use can become worn down over time, which may affect the performance of a vehicle as a whole. For example, vehicle tires have a limited lifetime and their grip on the road may degrade as the tread is worn down and they near the end of their life. As another example, as brake pads wear down their stopping ability can degrade and/or may cause damage to other braking components (e.g., rotors, drums, etc.). Failure to replace worn components in a timely manner can cause damage to other components, reduce ride quality (e.g., due to noise and/or vibration), and may reduce a safety of the vehicle.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
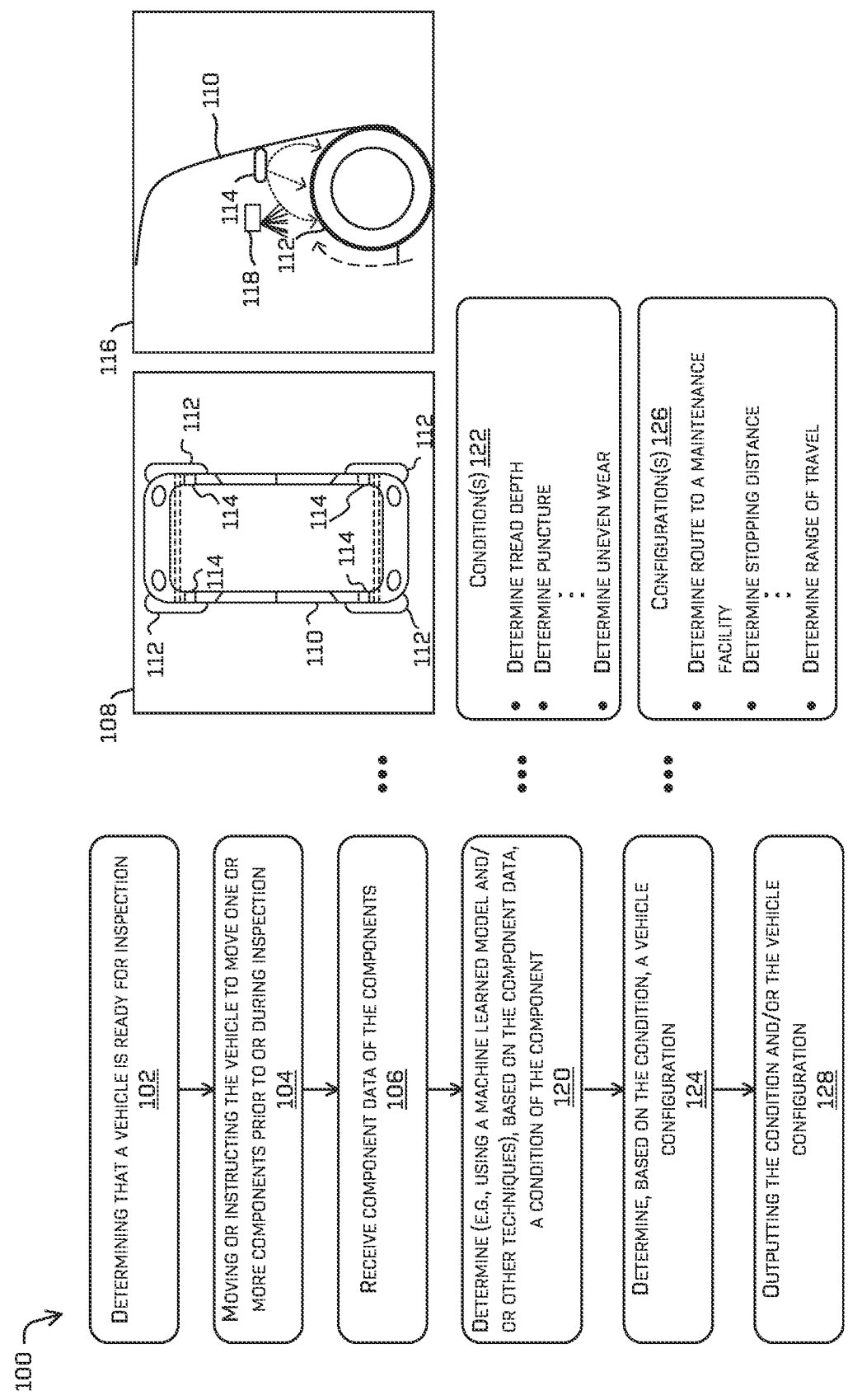
FIG. 1 is a pictorial flow diagram of an example process of receiving vehicle component data and determining a vehicle configuration data based on the vehicle component data.

This application relates to systems and techniques for monitoring one or more components of a vehicle using image data from one or more image sensors to determine a condition of the one or more components. In some examples, the techniques described herein can be used to determine a condition of one or more tires of the vehicle using a sensor onboard the vehicle or remote sensors at a charging station, a maintenance facility, or the like. The condition can be outputted to the vehicle or to fleet management system for further considerations such as limiting the vehicle's movement range or lowering the maximum speed of the vehicle.

In some examples, a vehicle may include one or more sensors capturing sensor data indicative of a condition of one or more component of the vehicle. The sensor data can represent, or otherwise be used to determine one or more conditions of one or more components of the vehicle. The conditions can include, but are not limited to, general wear, cracks, breaks, unusual wear, punctures, rust, fluid leaks, or the like. In some examples, the one or more conditions are current conditions of the one or more components of the vehicle.

In some examples, the one or more sensors may be attached, integrated with or otherwise incorporated into vehicle. Examples of such sensors are discussed in additional details in connection with FIG. 2 below, as well as throughout this disclosure. In some examples, each of the one or more sensors can monitor a particular vehicle component (e.g., one sensor per tire). In some examples, a single sensor can monitor several vehicle components. In some examples, a first sensor can monitor the one or more vehicle components located at a first side of the vehicle while a second sensor can monitor the one or more vehicle components located at a second side of the vehicle. In some examples, the first side may be a front side of the vehicle and the second side may be a back side of the vehicle. In some examples, the first side may be a left side of the vehicle and the second side may be a right side of the vehicle. In some examples, the one of more sensors can monitor the one or more components associated with, but not limited to, one or more tires, one or more suspension components, one or more axle components, one or more motor components, one or more drivetrain components and/or one or more joint components. In some examples, the vehicle can receive the sensor data indicative of the condition of one or more components of the vehicle in the form of vehicle component data. In some examples, the vehicle component data may be image data from one or more image sensors. In some examples, the one or more image sensors maybe attached to, integrated with, or otherwise incorporated into the vehicle. In some examples, the vehicle component data can be applied to a machine learning model, such as a convolutional neural network, to determine vehicle component condition. For example, image data representative of tire condition can be applied to the machine learning model to determine a condition of one or more tires. In some examples, vehicle component conditions (e.g., tire condition) can be determined through non-machine learning techniques. Examples of non-machine learning techniques for determining tire condition can include, but are not limited to, determining tire condition from measuring a tread depth of the tire, determining tire condition from a wear indicator (e.g., the indicator changes color as the tire wears) incorporated into the tire, determining tire condition through determining that a shape of the tire has changed, determining that the tire has a puncture, and/or the like. In some examples, the above-mentioned techniques may be applied using an image sensor, a physical sensor, and/or the like. In some examples, the vehicle can receive vehicle component condition and/or the vehicle component condition can be outputted to one or more remote systems and/or devices. In some examples, the vehicle component condition can be outputted to a fleet management computing device.

In some examples, the vehicle can determine vehicle configuration data based on the vehicle component condition. In some examples, the vehicle can receive reference data indicative of an undegraded condition of the one or more vehicle components. In some examples, the reference data may be stored in a memory on the vehicle. In some examples, the reference data may be stored on a database and/or a server separate from the vehicle. In some examples, the vehicle can determine the vehicle configuration data based on the reference data and the vehicle component condition. In some examples, the reference data can be indicative of an expected level of wear of a vehicle component (e.g., for a certain component use time and/or driving distance). A component that wears excessively compared to an expected amount can be indicative of component failure and/or the component being exposed to an uncommon condition (being struck by debris, unexpected environmental conditions, improper usage, etc.) and may be indicative of a component needing replacement and/or servicing. In some examples, the vehicle uses the vehicle configuration data to control itself. Examples of vehicle configuration data may be, but are not limited to, an instruction to navigate to a maintenance facility, an instruction to remove the vehicle from service, an estimated stopping distance, an instruction limiting a maximum operational speed of the vehicle, an instruction limiting a movement range of the vehicle, and/or the like.

In some examples, the vehicle can receive map data. The vehicle can use the map data to determine a maintenance facility closest to the vehicle's current location and/or determine a route to the maintenance facility. In examples where the vehicle configuration data is an instruction limiting a movement range of the vehicle, the vehicle can use the map data to determine the movement range based on the vehicle's current location.

In some examples, the vehicle may receive vehicle component data from one or more sensors separate from the vehicle (e.g., one or more remote sensors). In some examples, the one or more remote sensor may be located at a vehicle charging or refueling station or at a maintenance facility. In some examples, the one or more remote sensor maybe be located under a surface a vehicle may be stopped at. In some examples, the one or more remote sensors may include an image sensor. In some examples, the surface may be transparent to electromagnetic energy such as light of all spectrums. In some examples, the surface may be the surface in front of the vehicle charging or refueling station that the vehicle is parked in while charging or refueling. In some examples, the rotatable rollers can be incorporated into the surface whereby when the vehicle's tires are stopped on the rollers, the rollers operate to independently rotate the tires so the one or more remote sensors can monitor the condition of the tires through at least one revolution. In some examples, the surface may be an elevatable platform that a vehicle can be positioned on such as a platform in a vehicle maintenance facility. In some examples, the one or more remote sensor maybe be located on a movable arm such as a movable robotic arm. In some examples, the movable arm can be moved around the vehicle in order to monitor the one or more vehicle components. In those examples where the one or more remote sensor is located at a vehicle charger or pump, the one or more sensors can monitor the one or more vehicle components as the vehicle approaches the vehicle charging or refueling station.

In some examples, the one or more remote sensors may be located at a second vehicle. In some examples, the one or more remote sensors can monitor the vehicle as the second vehicle traverses past the vehicle. In some examples, the one or more remote sensors can monitor the vehicle as the second vehicle is stopped substantially adjacent to the vehicle. In some examples, the one or more remote sensors may be located at a roof of the second vehicle. In some examples, the one or more sensors may be located at an undercarriage of the second vehicle. In some examples, the one or more sensors may be located at a movable arm located at the second vehicle. Examples of the second vehicle may be, but are not limited to, an autonomous vehicle including an autonomous ground vehicle (e.g., on tires, treads, or tracks) or flying vehicle (e.g., a fixed wing drone, a single rotor or multi-rotor drone, or a hybrid VTOL) or a manually driven or piloted ground (e.g., on tires, treads, or tracks) or flying vehicle (e.g., a single or multi-engine plane or a single or multi-rotor helicopter).

Vehicle operation techniques described herein can improve a functioning of a vehicle by providing a robust method of determining a condition of one or more vehicle component of the vehicle using sensor data such as image data. In the context of determining the condition of the one or more vehicle component of the vehicle, the techniques discussed herein can determine a condition of one or more tires of the vehicle. Determining the condition of the one or more tires and/or other vehicle components may result in safer and more optimized vehicle operations. These and other improvements to the functioning of the vehicle are discussed herein.

The techniques described herein can be implemented in a number of ways. Example implementations are provided below with reference to the following Figures. Although discussed in the context of an autonomous vehicle, the methods, apparatuses, and systems described herein can be applied to a variety of systems (e.g., a sensor system or a robotic platform), and are not limited to autonomous vehicles. In one example, similar techniques may be utilized in driver-controlled vehicles in which such a system may provide an indication of whether it is safe to perform various maneuvers or whether it is safe to traverse a certain distance. In another example, the techniques can be utilized in aviation context, in an aerial surveying context, or in a nautical context. Additionally, the techniques described herein can be used with real data (e.g., captured using sensor(s)), simulated data (e.g., generated by a simulator), or any combination of the two.

FIG. 1 is a pictorial flow diagram of an example process 100 of receiving tire data of one or more tires of a vehicle and determining a vehicle configuration data based on the vehicle component data.

An operation 102 can include determining that a vehicle is ready for inspection. In some examples, operation 102 can include determining that the vehicle is ready for inspection when the vehicle is positioned to receive charge from a charging component. In some examples, the charging component may be part of a charging station. In some examples, operation 102 can include determining that the vehicle is ready for inspection when the vehicle arrives at a maintenance facility.

An operation 104 can include moving or instructing the vehicle to move one or more components of the vehicle. In some examples, the one or more components may be moved using, but not limited to, one or more robotic arms, one or more conveyors, one or more rollers, or other component of the charging station or the maintenance facility. In some examples, the one or more robotic arms, one or more conveyors, one or more rollers, or other components may be a part of a separate inspection robot or vehicle.

An operation 106 can include receiving component data of the one or more components of the vehicle. An example of acquiring such data is illustrated in example 108. As illustrated in the example 108, the component of the vehicle includes tires 112, and sensors 114 monitor tires 112. In some examples, operation 106 can include receiving tire data from a single sensor or multiple sensors. In some examples, operation 106 can include receiving tire data of a single tire or multiple tires. In some examples, sensors 114 are image sensors and component data are image data sensed by the image sensors. In some examples, the operation 106 can be performed by an autonomous vehicle, such as vehicle 110 of example 108, as it traverses an environment. Additional details of operation 106 are discussed in connection with FIGS. 2-6, as well as throughout this disclosure.

Example 116 illustrates the operation of one particular sensor of sensors 114. Sensor 114 as illustrated in Example 116 is an image sensor. The arrows exiting from sensor 114 represent multiple different portions of tire 112 that sensor 114 can image. Example 116 further include a light source 118. Light source 118 can illuminate at least all of the portions of tire 112 that sensor 114 can image. Examples of light sources may be, but are not limited to, coherent light sources, incoherent light sources, and/or the like. Light source 118 can emit light in visible, infrared, ultraviolet, or other spectrums. The arrow following the curvature of tire 112 represent the rotational direction of tire 112. Sensor 114 can continuously monitor tire 112 as tire 112 rotates along the rotational direction for at least one revolution of tire 112.

An operation 120 can include determining, based on the component data, one or more component conditions. Examples of such component conditions are illustrated as example condition(s) 122. Example condition(s) 122 can include, but are not limited to, determining tread depth, determining puncture and/or determining uneven wear, inflation amount, or the like. The one or more component conditions can be determined using a machine learned model and/or other techniques. In some examples, the component conditions may be the current conditions of the tires 112.

An operation 124 can include determine a vehicle configuration of the vehicle based on the condition(s) illustrated in example condition(s) 122. Examples of operation 124 are illustrated as example configuration(s) 126. Example configuration(s) 126 can include, but are not limited to, determining a route to a maintenance facility, determining a stopping distance and/or determining a movement range.

An operation 128 can include outputting the component condition and/or the vehicle configuration. In some examples, the condition can be output to the vehicle and logged by the vehicle. In some examples, the condition and associated vehicle configuration can be output to a remote system and/or device such as a fleet management computing device. In some examples, the vehicle configuration can be output to the vehicle, and the vehicle can determine control data to control itself based on the vehicle configuration.

Figure 2:
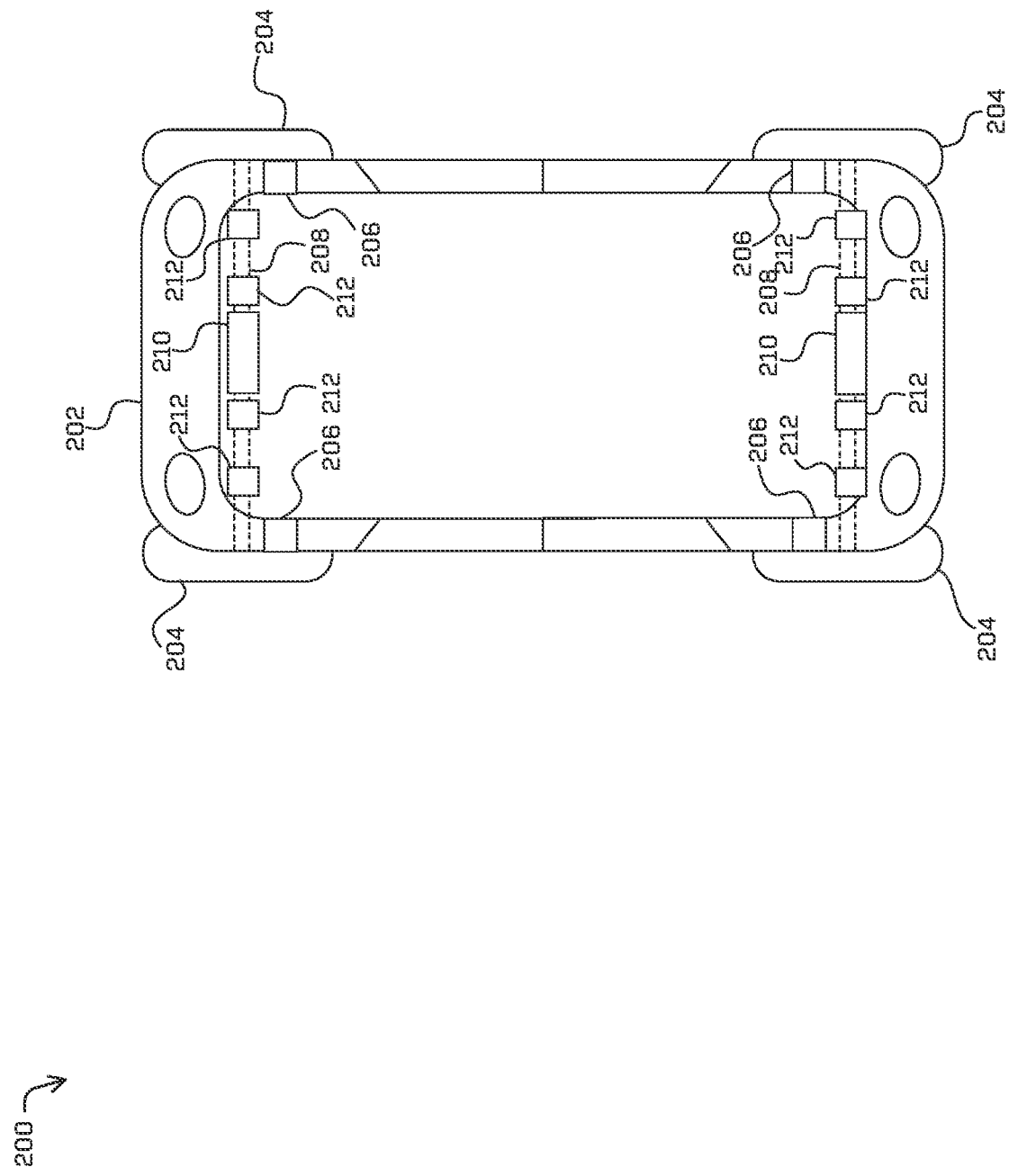
FIG. 2 is an illustration of an example system including one or more sensors located at a vehicle configured to monitor one or more vehicle components.

FIG. 2 is an illustration of example 200 which illustrates one or more sensor located at a vehicle configured to monitor one or more vehicle component.

The example 200 illustrates a top-down view of a vehicle 202, which may be an autonomous vehicle, traversing through an environment. Vehicle 202 may correspond to vehicle 110 of example 108. Tires 204 may correspond to tires 112 of example 108. Sensors 206 may correspond to sensors 114 of example 108. Example 200 further includes one or more drivetrain components 208, one or more motor components 210, and other vehicle components 212. In some examples, the one or more motor components 210 may include electric motor components, internal combustion engine components, or the like.

The vehicle 202 can receive vehicle component data detected by sensors 206. Examples of the one or more vehicle component may be, but are not limited to, one or more tires 204, one or more drivetrain components 208, one or more motor components 210, one or more exterior components such as a hood, a door, and/or a roof of vehicle 202, one or more other vehicle components 212 such as one or more sensor components, one or more battery system components, one or more exhaust system components, one or more coolant system components, one or more HVAC components, one or more suspension component, one or more brake system components, and/or the like. In some examples, sensors 206 can be integrated into, attached to, or otherwise associated with the vehicle 202. In some examples, sensors 206 may be, but not limited to, a single sensor or multiple sensors. In some examples, sensors 206 may be one or more fixed sensors. In some examples, sensors may be one or more moveable sensors. In some examples, sensors 206 may be mounted on one or more moveable arms that can rotate around vehicle 202 and allow sensors 206 to monitor relevant vehicle components. In some examples, sensors 206 may be, but are not limited to, being unidirectional, bi-directional, or omnidirectional sensors. In some examples, sensors 206 may be configured to monitor a particular component of the one or more vehicle component such as a particular tire of tires 204. In some examples, sensors 206 may be configured to monitor multiple components such as all of tires 204. In some examples, vehicle 202 can determine, based on the vehicle component data, a current condition of the vehicle components.

In some examples, sensors 206 may be image sensors, and vehicle 202 may receive image data from sensors 206 as vehicle component data. Examples of such image sensors may be time-of-flight sensors, lidar sensors, infrared sensors, cameras (e.g., RGB, IR, intensity, depth, etc.), and/or the like. In some examples, sensors 206 can detect tread depth of tires 204. In some examples, sensors 206 may be a camera that takes images of the treads of tires 204. In some examples, the images are within the visible spectrum. In some examples, the vehicle component data may be image data of one or more of tires 204. In some examples, vehicle 202 can determine one or more tire conditions of tires 204 based on the image data of tires 204 using a machine learned model. In some examples, the machine learned model may be trained using images of different tire conditions in order to help determine tire conditions of tires 204. In some examples, tire conditions may be, but are not limited to, shallow tread depth of tires 204, puncture on the surface of the tires 204, cracks on one or more surface of tires 204, one or more nail located on the surface of tires 204, uneven wear of the surface of tires 204, irregular wear of the surface of tires 204, localized abrasion of the surface of tires 204, bulging of the side wall of the surface of tires 204, misalignment between tires 204, deformation of tires 204, and/or the like. In some examples, the vehicle can determine based on the tire condition, vehicle configuration data. In some examples, vehicle 202 can determine control data to control itself based on the one or more vehicle configuration. Examples of the one or more vehicle configuration may be, but are not limited to, an instruction to navigate to a maintenance facility, an instruction to remove the vehicle from service, an estimated stopping distance, an instruction limiting a maximum operational speed of the vehicle, an instruction limiting a movement range of the vehicle, an instruction to contact a teleoperator, an instruction to contact emergency services, an instruction to contact a towing service, an instruction to log the tire condition, an instruction to adjust a date and/or a time of a scheduled maintenance of vehicle 202, an instruction to unlock and/or open one or more door and/or one or more windows of vehicle 202, and/or the like.

In some examples, sensors 206 can monitor the one or more vehicle component continuously. In some examples, sensors 206 can monitor tires 204 over at least one revolution of tires 204. In some examples, sensors 206 can monitor the one or more vehicle component based on a set schedule such as, but not limited to, every minute, 10 minutes, every half hour, every hour and/or the like. In some examples, sensors 206 can monitor the one or more vehicle component only while vehicle 202 is in operation. In some examples, sensors 206 can monitor the one or more vehicle component at any time including while vehicle 202 is not in operation.

In some examples, sensors 206 can monitor the one or more vehicle components only while vehicle 202 is stopped such as parked at a side of a road and/or parked in a parking spot. In some examples, sensors 206 can be scheduled to monitor the one or more vehicle component immediately after dropping off one or more passenger and prior to picking up one or more new passenger. In some examples, sensors 206 can monitor the one or more vehicle component based on user input such as input from one or more teleoperator.

In some examples, sensors 206 can provide image data across all surfaces of tires 204. In some examples, vehicle 202 can use reflected light detected by sensors 206 to determine that one or more foreign object such as a nail may be embedded within the one or more surface of tires 204. In some examples, a coating may be applied to the one or more vehicle component, such as to tires 204, prior to sensors 206 monitoring the one or more vehicle component. In some examples, the coating may be, but is not limited to, a powder or a paint. In some examples, the coating may be translucent in the visible spectrum. In some examples, the coating may reflect light of a particular spectrum of the electromagnetic spectrum such as ultraviolet, visible, or infrared spectrum. In some examples, the coating may be of one or more colors in the visible spectrum. In some examples, the coating allows vehicle 202 to more easily determine the condition of the vehicle component. In some examples, the coating may be a wear indicator of tires 204 and may change colors depending on a wear level of tires 204.

In some examples, sensors 206 can include one or more lasers wherein the one or more laser is emitted onto the treads of tires 204. In some examples, the color of the one or more lasers is within a visible or other spectrum. In some examples, the one or more lasers provides a marker of the floor of a particular tread of the treads thereby providing a more accurate approximation of tread depth. In some examples, a laser or other light source can project light across tire treads and reflect across sidewalls or floors of threads depending on the angle of incidence, for example. Features of the disclosure can take into account the incident angle upon the tire thread, the expected range of tire thread depth, the expected wear of a tire thread, etc. to correlate a return light pattern with thread wear (or other tire or component imperfections). In some examples, sensors 206 may be an infrared sensor, and the one or more laser may be within an infrared spectrum. The one or more lasers can also emit light in any other electromagnetic spectrum as necessary. In some examples, sensors 206 maybe a laser rangefinder such as lidar sensors or laser doppler sensors. In some examples, sensors 206 can use laser range finding to determine one or more punctures on one or more surface of tires 204. In some examples, sensors 206 can include one or more physical measurement indicators. In some examples, one or more physical measurement indicator can be inserted into the one or more treads of tires 204. In some examples, the physical measurement indicators can include measurement markings that can assist vehicle 202 in determining the tread depth of tires 204. In some examples, the measurement markings may be similar to those on a ruler. In some examples, depth imaging sensors such as lidar, time of flight, or binocular vision sensors can be used.

In some examples, sensors 206 may be one or more physical sensors that measure a property of a component of the vehicle by making physical contact with the component. In some examples, sensors 206 may include one or more measurement rods that can be inserted into the one or more treads of tires 204. In some examples, sensors 206 may be movable and/or retractable. In some examples, vehicle 202 can determine tread depths based on displacement distances of sensors 206. In some examples, vehicle 202 can determine the tread depths based on retracted distances of sensors 206. In some examples, the displacement distances or the retracted distances of sensors 206 may be indicative of one or more puncture of one or more surface of tires 204.

In some examples, sensors 206 can be one or more acoustic sensors. Examples of the one or more acoustic sensors may be, but are not limited to, one or more audible sound emitters and one or more audible sound transducer, one or more ultrasound emitters and one or more ultrasound transducers, and/or one or more infrasound emitters and one or more infrasound transducers. Vehicle 202 can receive acoustic data from sensors 206 and determine based on the acoustic data, the condition of tires 204. In some examples, vehicle 202 can determine one or more deformation of tires 204 such as abnormal bulging of tires 204 or a change in shape of tires 204 based on the acoustic data. In some examples, vehicle 202 can determine one or more foreign object, such as a nail, embedded in one or more surface of tires 204.

In some examples, vehicle 202 can receive reference data indicative of an undegraded condition of the vehicle component. In some examples, the reference data can be indicative of an expected level of wear of a vehicle component (e.g., for a certain component use time and/or driving distance). A component that wears excessively compared to an expected amount can be indicative of component failure and/or the component being exposed to an uncommon condition (being struck by debris, unexpected environmental conditions, improper usage, etc.) and may be indicative of a component needing replacement and/or servicing. Vehicle 202 can determine vehicle component condition by comparing the vehicle component data with the reference data. In some examples, vehicle 202 can determine a deformation of vehicle components such as a door of vehicle 202 or tires 204 by comparing the vehicle component data with the reference data wherein the reference data is indicative of the door or tires 204 lacking in deformation. In some examples, vehicle 202 can determine an extent of tire wear of tires 204 by comparing the tread depth from the vehicle component data and a tread depth from the reference data. In some examples, vehicle 202 can receive threshold data. In some examples, threshold data can include one or more thresholds associated with the one or more vehicle component. In some examples, vehicle 202 can determine the vehicle configuration based on comparing the vehicle component data and/or vehicle component condition of vehicle 202 with the threshold data. In some examples, the threshold data may include, but is not limited to, a first tread depth threshold, a second tread depth threshold, and a third tread depth threshold, each tread depth threshold may be associated with a different vehicle configuration. In some examples, each tread depth threshold may be indicative of increasing wear level of tires 204. In some examples, the first tire threshold may be associated with adjusting a stopping distance of vehicle 202, the second tire threshold may be associated with adjusting a movement range of vehicle 202, and the third tire threshold may be associated with determining a route to a maintenance facility. In some examples, vehicle 202 can compare the tread depth of tires 204 with the threshold data. In some examples, when the tread depth exceeds the first tire threshold (e.g., the tread depth is shorter than the first tire threshold), vehicle 202 can increase its stopping distance. In some examples, when the tread depth exceeds the second tread depth threshold, vehicle 202 can limit its movement range. In some examples, vehicle 202 can receive map data and/or location data. In some examples, vehicle 202 can limit its movement range through geofencing based on the map data and/or the location data. In some examples, when the tread depth exceeds the third tread depth threshold, vehicle 202 can determine, based on at least one of the map data, location data or the movement range, a route to a maintenance facility. In some examples, the maintenance facility may be determined from a number of candidate maintenance facilities within the geofenced movement range. In some examples, the determined maintenance facility may be the closest maintenance facility by distance to the current location of vehicle 202. In some examples, vehicle 202 can receive environment data such as meteorological data, traffic data, and/or road condition data. In some examples, vehicle 202 can determine an efficiency cost of traversing to each candidate maintenance facility based on the environmental data and can determine the maintenance facility based on the efficiency cost. In some examples, vehicle 202 can determine, based on at least the environmental data and the map data and/or the location data, a route to the maintenance facility that would take the shortest amount of time for vehicle 202 to traverse to. In some examples, the vehicle configuration associated with each higher threshold includes the vehicle configuration associated with a lower threshold. In some examples, each vehicle configuration associated with each threshold is independent of each other. In some examples, the reference data and the threshold data may be stored on vehicle 202. In some examples, the reference data and the threshold data may be transmitted to 202 from a remote device. In some examples, each threshold in threshold data may correspond to a percent of wear of the one or more vehicle component.

In some examples, vehicle component data can further include an age of the one or more vehicle component. In some examples, the reference data can include a date of manufacturing of the one or more vehicle component, and vehicle 202 can determine the age based on a current data and the date of manufacturing. In some examples, vehicle 202 can determine the condition of the one or more vehicle component based on the age.

In some examples, vehicle component data can further include a distance traveled of vehicle 202 since installation of the one or more vehicle component. In some examples, vehicle 202 can determine the condition of the one or more vehicle component based on the distance traveled.

In some examples, vehicle 202 can receive meteorological data including weather forecast and historical weather trend. In some examples, vehicle 202 can determine, based on the condition, the meteorological data, and/or a current data, changing a flat tire, a worn tire, and/or swapping types of tires such as switching tires 204 from summer tire to winter tire or winter tire to summer tire. In some examples, vehicle 202 can determine, based on the condition, changing one or more vehicle components.

Additionally and/or alternatively, vehicle 202 can use sensors 206 to determine a condition of one or more drivetrain components 208. Examples of the one or more drivetrain components may include, for example but not limited to, axles, half shafts, CV joints, bushing mounts, clutches, gearboxes, transmissions, differentials, flywheels, final drives, transfer cases, or the like. Examples of the conditions of the one or more drivetrain components 208 may include, but are not limited to, wear of the one or more drive train components, deformation of the one or more drivetrain components 208, one or more cracks on the one or more drivetrain components 208, breakage of the one or more drivetrain components 208, corrosion of the one or more drivetrain components 208, discoloration of the one or more drivetrain components 208, and/or the like. In some examples, vehicle 202 receives vehicle component data indicative of a condition of the one or more drivetrain components 208, vehicle 202 can determine one or more vehicle configurations similar to those described herein and control itself based on the one or more vehicle configurations including different vehicle configurations each associated with varying degrees of thresholds as described herein.

Additionally and/or alternatively, vehicle 202 can use sensors 206 to determine a condition of one or more suspension component (illustrated as part of one or more other vehicle components 212) of vehicle 202 (e.g., shocks, springs, bushings, etc.). Examples of the condition of the one or more suspension component may include, but are not limited to, deformation, cracking, breakage, corrosion, discoloration, fluid leakage, and/or the like. In some examples, vehicle 202 receives vehicle component data indicative of the condition of the suspension component, vehicle 202 can determine one or more vehicle configuration similar to those described herein and control itself based on the one or more vehicle configuration including different vehicle configurations each associated with varying degrees of thresholds as described herein. Additionally and/or alternatively, the vehicle configuration can include adjusting a stiffness of the one or more suspension component and/or a height of the one or more suspension component based on the condition of one or more suspension component.

Additionally and/or alternatively, vehicle 202 can use sensors 206 to determine a condition of one or more brake system component (illustrated as part of one or more other vehicle components 212) of vehicle 202. Examples of the condition of the one or more brake system components may include, but are not limited to, deformation, cracking, breakage, corrosion, discoloration, fluid leakage, expired fluid, brake pad wear, and/or the like. In some examples, vehicle 202 receives vehicle component data indicative of the condition of the brake system components, vehicle 202 can determine one or more vehicle configuration similar to those described herein and control itself based on the one or more vehicle configuration including different vehicle configurations each associated with varying degrees of thresholds as described herein.

Additionally and/or alternatively, vehicle 202 can use sensors 206 to determine a condition of one or more motor component 210. Examples of the condition of the one or more motor component 210 may include, but are not limited to, deformation, cracking, breakage, corrosion, discoloration, leakage, and/or the like. In some examples, vehicle 202 receives vehicle component data indicative of the condition of the one or more motor components 210, vehicle 202 can determine one or more vehicle configuration similar to those described herein and control itself based on the one or more vehicle configuration including different vehicle configurations each associated with varying degrees of thresholds as described herein.

Additionally, and/or alternatively, vehicle 202 can use sensors 206 to determine a condition of one or more other vehicle components 212, such as one or more sensor components, one or more battery system components, one or more exhaust system components (in the case of an internal combustion engine), one or more coolant system components (for the battery system components or motor components), one or more HVAC components (e.g., condenser, dyer, expansion valve, compressor, etc.), or the like. Examples of the condition of the one or more other vehicle components 212 may include, but are not limited to, wear, deformation, cracking, breakage, corrosion, discoloration, leakage, and/or the like. In some examples, vehicle 202 receives vehicle component data indicative of the condition of the one or more other vehicle components 212, vehicle 202 can determine one or more vehicle configuration similar to those described herein and control itself based on the one or more vehicle configuration including different vehicle configurations each associated with varying degrees of thresholds as described herein.

Additionally and/or alternatively, vehicle 202 can use sensors 206 to determine a condition of one or more exterior component of vehicle 202. Examples of the one or more exterior component may be, but not limited to, one or more door, a hood, bonnet, frunk, or nose boot, a trunk or boot, a roof, one or more side mirror, one or more light fixture such as, but not limited to, one or more headlight and/or one or more tail light, one or more reflector, an undercarriage, and/or the like. Examples of the condition of the one or more exterior component may include, but are not limited to, deformation, cracking, breakage, corrosion, discoloration, no longer able operate as intended such as a bulb of the lighting fixture ceases to function, and/or the like. In some examples, vehicle 202 receives vehicle component data indicative of the condition of the exterior component, vehicle 202 can determine one or more vehicle configuration similar to those described herein and control itself based on the one or more vehicle configuration including different vehicle configurations each associated with varying degrees of thresholds as described herein.

Additionally, and/or alternatively, vehicle 202 can determine a condition of one or more vehicle component has exceeded a threshold indicative of requiring emergency maintenance of the one or more vehicle component. In some examples, when vehicle 202 determines the condition has exceeded the threshold, vehicle 202 can determine a route to a maintenance facility as discussed herein. In some examples, vehicle 202 can further determine that vehicle 202 is unable to traverse to any of the maintenance facility based on at least the condition of the vehicle component, a map data and/or location data, or an environmental data and determine one or more emergency action. Examples of the emergency action may include, but are not limited to, determining a drop off location to drop off one or more passengers and dropping off the one or more passengers at the drop off location, determining a parking location and stopping vehicle 202 at the parking location, contacting one or more teleoperator, contacting emergency services and/or a towing service, contacting one or more maintenance facility, and/or the like.

Figure 3:
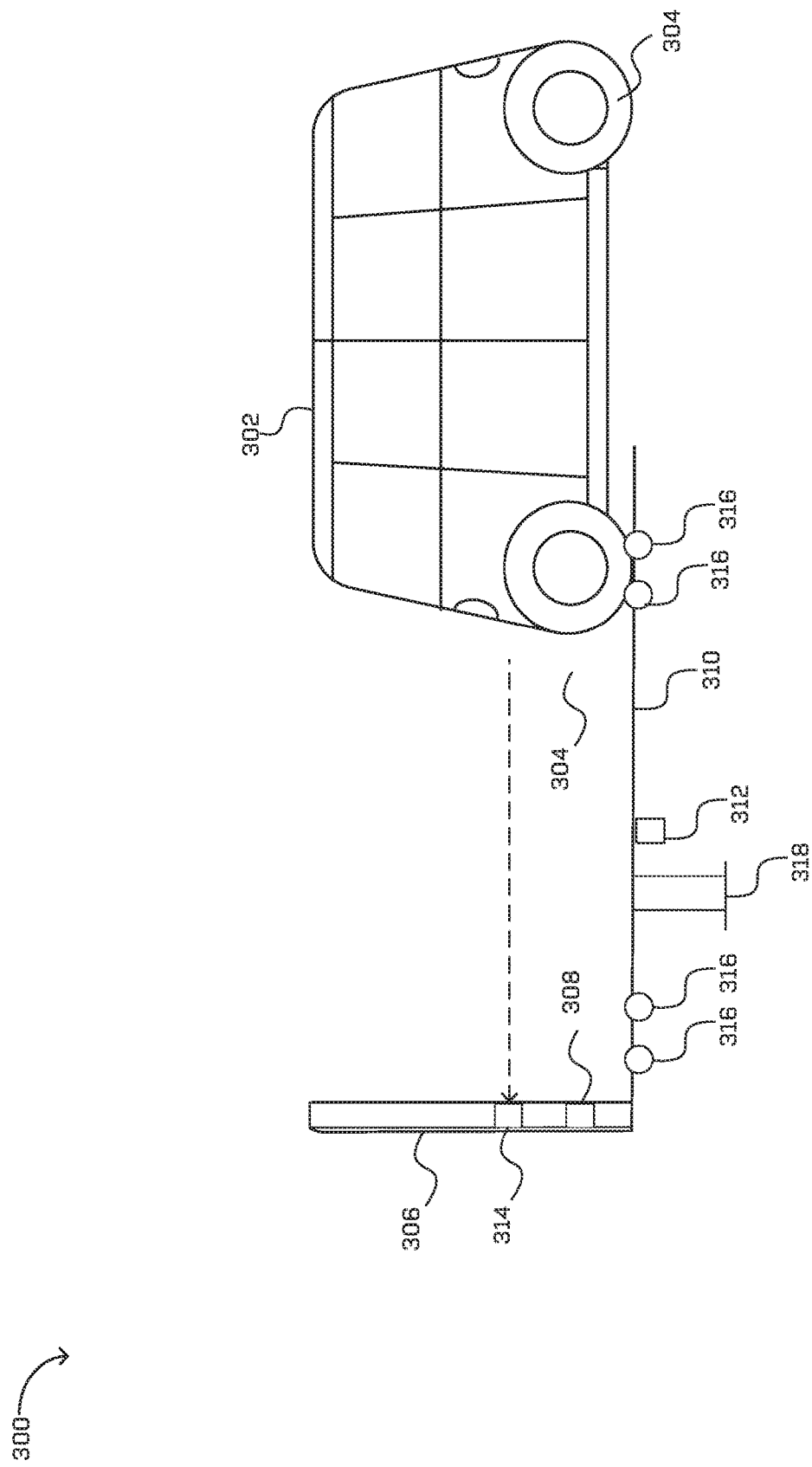
FIG. 3 is an illustration of an example of a system including one or more remote sensors configured to monitor one or more vehicle components.

FIG. 3 is an illustration of an example 300 of a system including one or more remote sensor configured to monitor one or more vehicle component of a vehicle.

Example 300 illustrates a side view of a vehicle 302, which may be an autonomous vehicle and includes one or more tires 304, component monitoring station 306, sensor 308, surface 310, sensor 312, proximity sensor 314, rollers 316, and one or more lift components 318.

In some examples, the vehicle 302 can receive vehicle component data detected by sensor 308 and/or sensor 312. In some examples, sensor 308 and sensor 312 may be the same type of sensors as described in FIG. 2, as well as throughout this disclosure. In some examples, sensor 308 and sensor 312 may be the same type of sensors. In some examples, sensor 308 and sensor 312 may be different types of sensors. In some examples, sensor 308 may be integrated with, attached to, or otherwise associated with component monitoring station 306. In some examples, sensor 312 may be integrated with, attached to, or otherwise associated with surface 310. In some examples, sensor 308 and sensor 312 may be single sensors. In some examples, sensor 308 and sensor 312 may comprise multiple sensors. In some examples, sensor 308 and sensor 312 may be fixed sensors. In some examples, sensor 308 and sensor 312 may be movable sensors. In some examples, sensor 308 and sensor 312 may be attached to or integrated into one or more movable arms. The robotic arm may be configured to position sensor 308 and/or 312 around vehicle 302 in order to monitor one or more vehicle components of vehicle 302. In some examples, sensors 308 and 312 may be image sensors as described in FIG. 2, as well as throughout this disclosure. In some examples, proximity sensor 314 can detect a distance of vehicle 302 from component monitoring station 306. In some examples, sensor 308 and/or sensor 312 automatically starts monitoring the one or more vehicle component of vehicle 302 when a vehicle distance from the component monitoring station 306 is below a distance threshold. In some examples, sensor 308 and/or sensor 312 can continuously monitor tires 304 as vehicle 302 approaches component monitoring station 306. In some examples, the distance threshold is sufficient to ensure that each tire of tires 304 can rotate at least one full revolution before arriving at component monitoring station 306 in order to monitor the entirety of tires 304. In some examples, tires 304 can correspond with tires 204. In some examples, the one or more vehicle components may be tires 304 or any other vehicle component described in FIG. 2, as well as throughout this disclosure. In some examples, the vehicle component data may be the same as the vehicle component data as described in FIG. 2, as well as throughout this disclosure. In some examples, component monitoring station 306 includes one or more remote computing device components including, but are not limited to, one or more processors, one or more memories, one or more storage, and/or the like. In some examples, the remote computing devices can determine vehicle component condition based on the vehicle component data and determine one or more vehicle configuration based on the vehicle component data as described in FIG. 2 as well as throughout this disclosure. In some examples, the vehicle configuration may be the same as the vehicle configuration described in FIG. 2, as well as throughout this disclosure. In some examples, the remote computing devices can output the vehicle component condition and/or vehicle configuration data to vehicle 302 and/or a fleet management computing device.

In some examples, surface 310 can be transparent to one or more electromagnetic spectrum. In some examples, surface 310 can be transparent to the visible spectrum. In some examples, component monitoring station 306 may be a vehicle charging station or a component of the vehicle charging station. In examples, where the component monitoring station 306 may be a vehicle station or a component of the vehicle charging station, the component monitoring station 306 may automatically being monitoring one or more vehicle components of vehicle 302 after vehicle 302 transmits a signal to the vehicle charging station that it is initiating charging procedure. In some examples, the component monitoring station 306 may perform the vehicle component monitoring process before charging vehicle 302. In some examples, the component monitoring station 306 may perform the vehicle component monitoring process concurrent with the vehicle charging process. In some examples, the component monitoring station 306 may perform the vehicle component monitoring process after the completion of the vehicle charging process. In some examples, an operator (e.g., a teleoperator or a maintenance facility operator) may transmit a signal to component monitoring station 306 to start the vehicle component monitoring process. In some examples, surface 310 may be a parking location and component monitoring station 306 may be a parking meter or a component of a parking sign and/or road sign. While component monitoring station 306 is illustrated as being located in front of vehicle 302, component monitoring station 306 may also be situated at other locations around vehicle 302 such as besides, above, below, or the like. In some examples, the component monitoring station 306 may include a stationary frame under which vehicle 302 could drive. In some examples, surface 310 may be sized to fit the undercarriage of vehicle 302. In some examples, rollers 316 are attached to, incorporated into, and/or otherwise associated with surface 310. In some examples, rollers 316 can independently rotate whereby when tires 304 are stopped on rollers 316, each particular roller of roller 316 can independently rotate each tire of tires 304 so that sensors 308 and 312 can monitor the surfaces of tires 304 through at least one revolution of tires 304. In some examples, rollers 316 are positioned so that when at least one of tires 304 is positioned between two rollers as illustrated in Example 300, the two rollers rotate concurrently to rotate that particular tire. In some examples, surface 310 may be an elevatable platform separable from the component monitoring station 306 where when vehicle 302 is positioned on surface 310. In some examples, lift component 318 may elevate surface 310. Examples of lift component 318 elevating surface 310 may be, but are not limited to, four post lift, two post lift, scissor lift, portable lift, in-ground lift, alignment lift, mobile column lift, or the like. In some examples, surface 310 may contain sensors when senses the presence of vehicle 302 on surface 310, automatically elevates surface 310. In some examples, component monitoring station 306 may automatically transmit a signal, based at least in part on a signal from proximity sensor 314, to the one or more lift components 318 to elevate surface 310. In some examples, vehicle 302 may automatically transmit a signal to the one or more lift components 318 to elevate surface 310. In some examples, an operator (e.g., a teleoperator or a maintenance facility operator) may transmit a signal to the one or more lift components 318 to elevate surface 310. In those examples where surface 310 is sized to fit the undercarriage of vehicle 302, vehicle 302 can freely rotate tires 304 in the air while surface 310 is elevated. In those examples where the component monitoring station where the component monitoring station 306 includes the stationary frame, surface 310 may be a elevatable bar movable along the side bars of the stationary frame, whereby when vehicle 302 is positioned under the stationary frame and above surface 310, surface 310 can operate to elevate vehicle 302. In some examples, vehicle 302 may automatically and independently rotate each tire of tires 304. In some examples, component monitoring station 306 may transmit a signal to vehicle 302 to independently rotate each tire of tires 304. In some examples, an operator (e.g., a teleoperator or a maintenance facility operator) may transmit a signal to vehicle 302 to independently rotate each tire of tires 304.

In some examples, component monitoring station 306, sensor 308, surface 310, sensor 312, proximity sensor 314, and rollers 316 may be parts of a vehicle maintenance facility, and vehicle 302 is monitored by sensors 308 and 312 as a part of regularly scheduled maintenance or on demand maintenance. In some examples, component monitoring station 306 may begin the vehicle component monitoring process upon vehicle 302 arriving at the vehicle maintenance facility. In some examples, the component monitoring station 306 may be part of, or be located at or proximate to, a vehicle charging station and/or at a vehicle maintenance facility.

Figure 4:
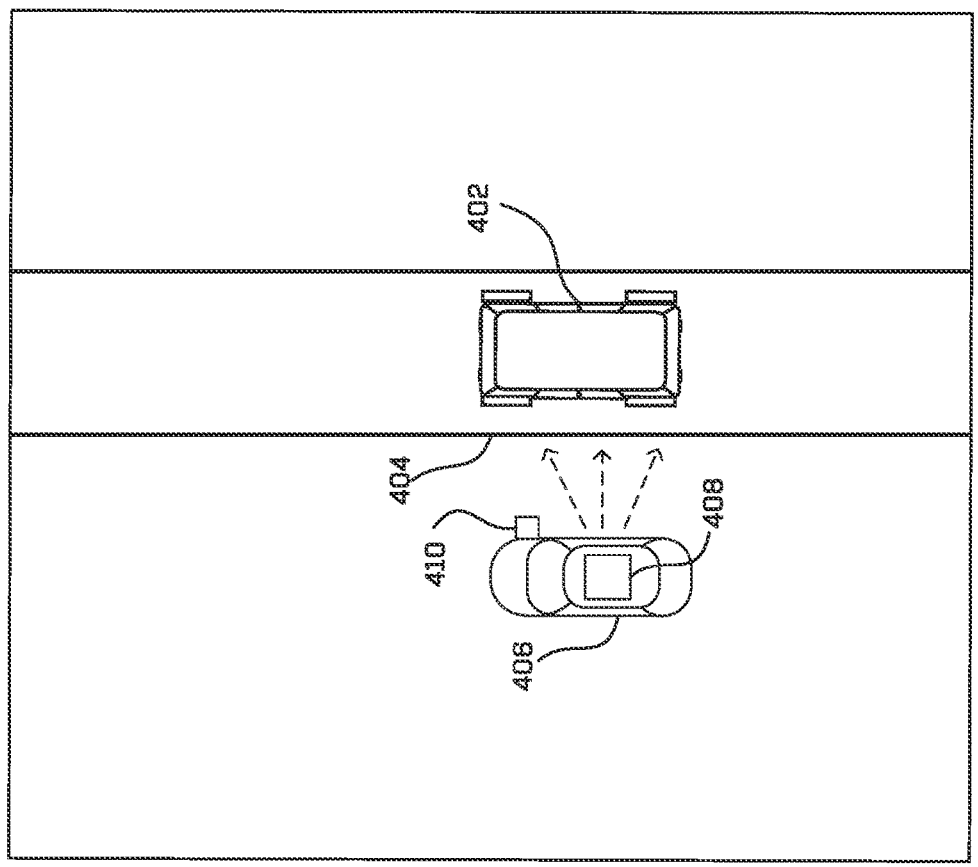
FIG. 4 is an illustration of an example of a second vehicle configured to monitor one or more vehicle components.

FIG. 4 is an illustration of examples 400 of a second vehicle monitoring one or more vehicle component of a first vehicle.

Example 400 illustrates a top-down view of a first vehicle 402, which may be an autonomous vehicle, stopped in parking lane 404 on the side of a road and a second vehicle 406 substantially adjacent to first vehicle 402. In some examples, first vehicle 402 may correspond to vehicle 202 described in FIG. 2 as well as throughout this disclosure. In some examples, one or more vehicle components of first vehicle 402 may correspond to the one or more vehicle components described in FIG. 2, as well as throughout this disclosure. Examples of second vehicle 406 may be, but are not limited to, an autonomous vehicle, a manually driven vehicle, a manually piloted aircraft, a remotely piloted aircraft, an autonomous aircraft, a waterborne vehicle (manually operated, remotely operated, or autonomous), and/or the like. In some examples, second vehicle 406 may be a platform that could drive under first vehicle 402, a movable frame that could partially (e.g., an arm or gantry) or entirely (e.g., a tunnel or archway) encircle first vehicle 402 (e.g., like a drive through car wash). In some examples, second vehicle 406 the same or similar model as first vehicle 402, and monitors first vehicle 402 using sensors corresponding to sensors described in FIGS. 2 and 3, as well as throughout this disclosure. In some examples, the second vehicle 406 may use existing cameras, lidar, time of flight, sonar, and/or other perception sensors to capture sensor data of one or more components of the first vehicle. Examples of autonomous vehicles and manually driven vehicles may include, but are not limited to, vehicles using tires, tracks, and/or treads to traverse an environment. Examples of aircrafts include, but are not limited to, single or multi-rotary helicopter or drones, fixed winged aircraft or drones, and/or the like. In some examples, second vehicle 406 can include sensor 408 and/or 410. In some examples, sensor 408 and 410 may be integrated with, attached to, or otherwise associated with second vehicle 406. In some examples, sensor 408 may correspond to sensors 206 described in FIG. 2 as well as throughout this disclosure. In some examples, sensor 408 may be a single sensor. In some examples, sensor 408 may be multiple sensors. In some examples, sensor 408 may be integrated with or attached to one or more of a roof of second vehicle 406, an undercarriage of second vehicle 406, or an exterior component of second vehicle 406 such as one or more door or one or more side mirror. In some examples, sensor 408 may be integrated with or attached to one or more moveable and/or retractable arms attached to or integrated with second vehicle 406. Second vehicle 406 can move the arms to position sensor 408 to monitor the side surface and/or tread surface of one or more tires of first vehicle 402. The functions of the arms associated with sensor 408 may correspond to the arms described in FIGS. 2 and 3 as well as throughout this disclosure. In some examples, sensor 410 may be attached to, integrated with, and/or otherwise associated with the side of second vehicle 406 such as being attached the fender of second vehicle 406. In some examples, sensor 410 may be attached to, integrated with, and/or otherwise associated with one or more moveable and/or retractable arms. Second vehicle 406 can move the arms to position sensor 410 to monitor the side surface and/or tread surface of one or more tires of first vehicle 402. The functions of the arms associated with sensor 410 may correspond to the arms described in FIGS. 2 and 3 as well as throughout this disclosure. In some examples, first vehicle 402 can receive vehicle component data from sensor 408 and/or 410. In some examples, vehicle component data corresponds to vehicle component data as described in FIGS. 2 and 3 as well as throughout this disclosure. In some examples, first vehicle 402 can determine a condition of the one or more vehicle components based on the vehicle component data as described in FIGS. 2 and 3 as well as throughout this disclosure. In some examples, first vehicle 402 can determine one or more vehicle configuration data based on the condition and determine control data to control itself based on the vehicle configuration data as described in FIGS. 2 and 3 as well as throughout this disclosure.

In some examples, second vehicle 406 may be configured to monitor first vehicle 402 while first vehicle 402 is in a parallel parking configuration. In some examples, second vehicle 406 may be configured to monitor first vehicle 402 while first vehicle 402 is in a perpendicular parking configuration or a diagonal parking configuration such as in a parking lot of a supermarket, a shopping mall, or a parking garage. In some examples, second vehicle 406 can follow either behind or substantially adjacent to first vehicle 402 as first vehicle 402 traverses through an environment in order to continuously monitor first vehicle 402. In some examples, second vehicle 406 can determine the condition of the one or more vehicle components, determine the one or more vehicle configuration, and communicate the one or more vehicle configuration to first vehicle 402. In some examples, if first vehicle 402 is non-operational, second vehicle 406 can communicate with one or more, but not limited to, a teleoperator, emergency services, towing services, or a maintenance facility.

Alternatively, sensor 408 and/or 410 may be mounted on one or more moveable arms that are attached to, integrated with, or otherwise associated with first vehicle 402. The moveable arms can position sensor 408 and/or 410 to position to monitor various vehicle components as necessary. The functions of the arms associated with sensor 410 may correspond to the arms described in FIGS. 2 and 3 as well as throughout this disclosure.

Figure 5:
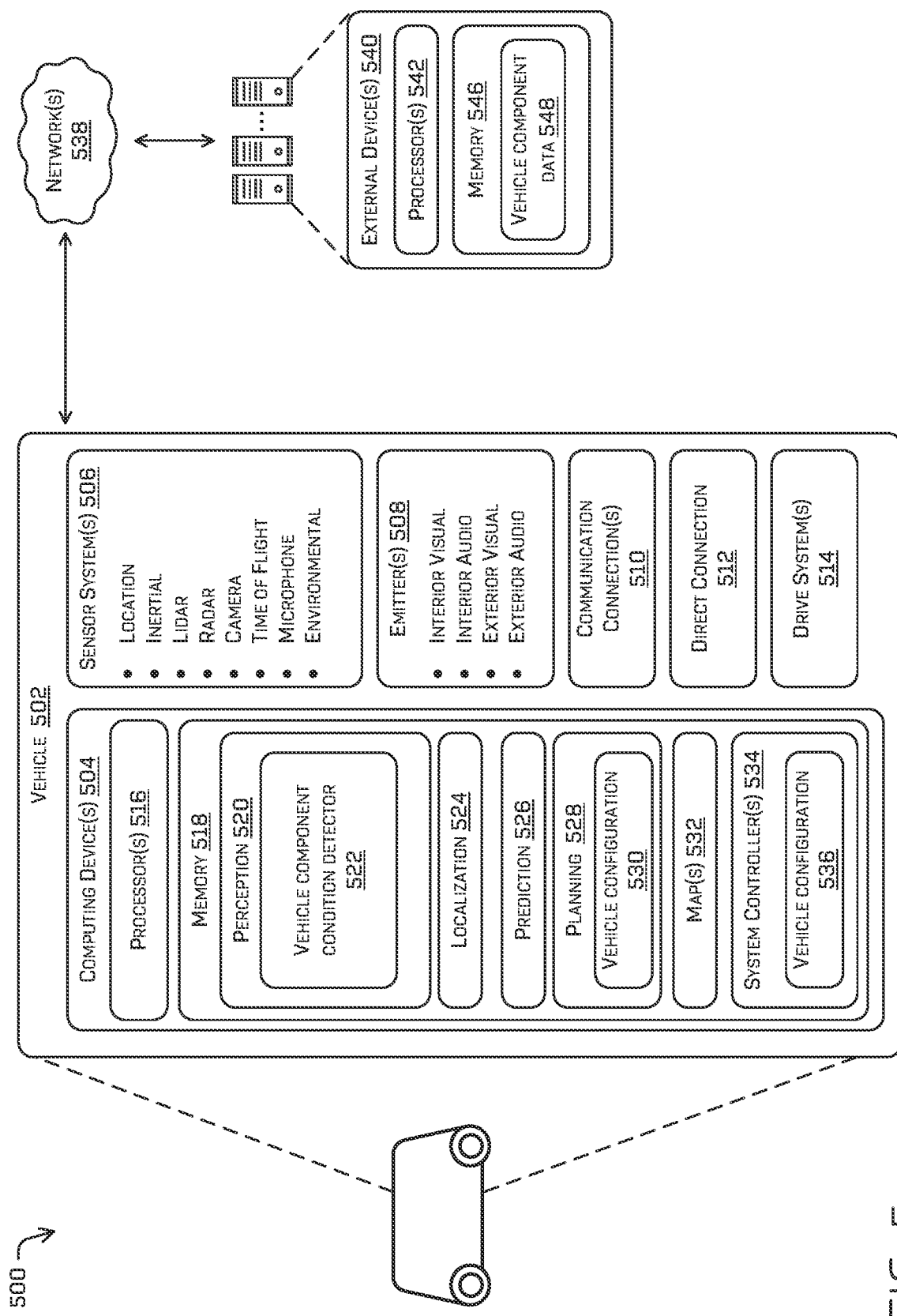
FIG. 5 depicts a block diagram of an example system for implementing the techniques described herein.

FIG. 5 depicts a block diagram of an example system 500 for implementing the techniques described herein. In at least one example, the system 500 can include a vehicle 502. In the illustrated example, system 500, the vehicle 502 is an autonomous vehicle; however, the vehicle 502 can be any other type of vehicle.

The vehicle 502 can be a driverless vehicle, such as an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. In such examples, because the vehicle 502 can be configured to control all functions from start to completion of the trip, including all parking functions, it may not include a driver and/or controls for driving the vehicle 502, such as a steering wheel, an acceleration pedal, and/or a brake pedal. This is merely an example, and the systems and methods described herein may be incorporated into any ground-borne, airborne, or water-borne vehicle, including those ranging from vehicles that need to be manually controlled by a driver at all times, to those that are partially or fully autonomously controlled.

The vehicle 502 can include one or more computing device(s) 504, one or more sensor system(s) 506, one or more emitter(s) 508, one or more communication connec-tion(s) 510 (also referred to as communication devices and/or modems), at least one direct connection 512 (e.g., for physically coupling with the vehicle 502 to exchange data and/or to provide power), and one or more drive system(s) 514. The one or more sensor system(s) 506 can be configured to capture sensor data associated with an environment.

The one or more sensor system(s) 506 can include time-of-flight sensors, location sensors (e.g., GPS, compass, etc.), inertial sensors (e.g., inertial measurement units (IMUs), accelerometers, magnetometers, gyroscopes, etc.), lidar sensors, radar sensors, sonar sensors, infrared sensors, cameras (e.g., RGB, IR, intensity, depth, etc.), microphone sensors, environmental sensors (e.g., temperature sensors, humidity sensors, light sensors, pressure sensors, etc.), ultrasonic transducers, wheel encoders, etc. The one or more sensor system(s) 506 can include multiple instances of each of these or other types of sensors. For instance, the time-of-flight sensors can include individual time-of-flight sensors located at the corners, front, back, sides, and/or top of the vehicle 502. As another example, the camera sensors can include multiple cameras disposed at various locations about the exterior and/or interior of the vehicle 502. The one or more sensor system(s) 506 can provide input to the computing device 504.

The vehicle 502 can also include one or more emitter(s) 508 for emitting light and/or sound. The one or more emitter(s) 508 in this example include interior audio and visual emitters to communicate with passengers of the vehicle 502. By way of example and not limitation, interior emitters can include speakers, lights, signs, display screens, touch screens, haptic emitters (e.g., vibration and/or force feedback), mechanical actuators (e.g., seatbelt tensioners, seat positioners, headrest positioners, etc.), or the like. The one or more emitter(s) 508 in this example also include exterior emitters. By way of example and not limitation, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which may comprise acoustic beam steering technology.

The vehicle 502 can also include one or more communication connection(s) 510 that enable communication between the vehicle 502 and one or more other local or remote computing device(s) (e.g., a remote teleoperation computing device) or remote services. For instance, the one or more communication connection(s) 510 can facilitate communication with other local computing device(s) on the vehicle 502 and/or the one or more drive system(s) 514. Also, the one or more communication connection(s) 510 can allow the vehicle 502 to communicate with other nearby computing device(s) (e.g., other nearby vehicles, traffic signals, etc.).

The one or more communications connection(s) 510 can include physical and/or logical interfaces for connecting the computing device 504 to another computing device or one or more external networks 538 (e.g., the Internet). For example, the one or more communications connection(s) 510 can enable Wi-Fi-based communication such as via frequencies defined by the IEEE 802.11 standards, short range wireless frequencies such as Bluetooth, cellular communication (e.g., 2G, 3G, 4G, 4G LTE, 5G, etc.), satellite communication, dedicated short-range communications (DSRC), or any suitable wired or wireless communications protocol that enables the respective computing device to interface with the other computing device(s).

In at least one example, the vehicle 502 can include one or more drive system(s) 514. In some examples, the vehicle 502 can have a single drive system 514. In at least one example, if the vehicle 502 has multiple drive systems 514, individual drive systems 514 can be positioned on opposite ends of the vehicle 502 (e.g., the front and the rear, etc.). In at least one example, the drive system(s) 514 can include one or more sensor system(s) 506 to detect conditions of the drive system(s) 514 and/or the surroundings of the vehicle 502. By way of example and not limitation, the sensor system(s) 506 can include one or more wheel encoders (e.g., rotary encoders) to sense rotation of the wheels of the drive systems, inertial sensors (e.g., inertial measurement units, accelerometers, gyroscopes, magnetometers, etc.) to measure orientation and acceleration of the drive system, cameras or other image sensors, ultrasonic sensors to acoustically detect objects in the surroundings of the drive system, lidar sensors, radar sensors, etc. Some sensors, such as the wheel encoders can be unique to the drive system(s) 514. In some cases, the sensor system(s) 506 on the drive system(s) 514 can overlap or supplement corresponding systems of the vehicle 502 (e.g., sensor system(s) 506).

The drive system(s) 514 can include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 514 can include a drive system controller which can receive and preprocess data from the sensor system(s) 506 and to control operation of the various vehicle systems. In some examples, the drive system controller can include one or more processor(s) and memory communicatively coupled with the one or more processor(s). The memory can store one or more components to perform various functionalities of the drive system(s) 514. Furthermore, the drive system(s) 514 also include one or more communication connection(s) that enable communication by the respective drive system with one or more other local or remote computing device(s).

The computing device 504 can include one or more processor(s) 516 and memory 518 communicatively coupled with the one or more processor(s) 516. In the illustrated example, the memory 518 of the computing device 504 stores a perception component 520 comprising a vehicle component condition detector 522, a localization component 524, a prediction component 526, a planning component 528 comprising a vehicle configuration component 530, a maps component 532, and one or more system controller(s) 534 comprising a vehicle configuration 538. Though depicted as residing in the memory 518 for illustrative purposes, it is contemplated that the perception component 520, the vehicle component condition detector 522, the localization component 524, the prediction component 526, the planning component 528, the vehicle configuration component 530, the maps component 532, the one or more system controller(s) 534, and the vehicle configuration component 536 can additionally, or alternatively, be accessible to the computing device 504 (e.g., stored in a different component of vehicle 502) and/or be accessible to the vehicle 502 (e.g., stored remotely).

The perception component 520 can include functionality to perform object detection, segmentation, and/or classification. In some examples, the perception component 520 can provide processed sensor data that indicates a presence of an entity that is proximate to the vehicle 502 and/or a classification of the entity as an entity type (e.g., car, pedestrian, cyclist, building, tree, road surface, curb, sidewalk, unknown, etc.). In additional and/or alternative examples, the perception component 520 can provide processed sensor data that indicates one or more characteristics associated with a detected entity and/or the environment in which the entity is positioned. In some examples, characteristics associated with an entity can include, but are not limited to, an x-position (global position), a y-position (global position), a z-position (global position), an orientation, an entity type (e.g., a classification), a velocity of the entity, an extent of the entity (size), etc. Characteristics associated with the environment can include, but are not limited to, a presence of another entity in the environment, a state of another entity in the environment, a time of day, a day of a week, a season, a weather condition, an indication of darkness/light, etc.

Further, the perception component 520 can include functionality to store perception data generated by the perception component 520. In some instances, the perception component 520 can determine a track corresponding to an object that has been classified as an object type. For purposes of illustration only, the perception component 520, using sensor system(s) 506 can capture one or more images of an environment. The sensor system(s) 506 can capture images of an environment that includes an object, such as a pedestrian. The pedestrian can be at a first position at a time T and at a second position at time T+t (e.g., movement during a span of time t after time T). In other words, the pedestrian can move during this time span from the first position to the second position. Such movement can, for example, be logged as stored perception data associated with the object.

The stored perception data can, in some examples, include fused perception data captured by the vehicle. Fused perception data can include a fusion or other combination of sensor data from sensor system(s) 506, such as image sensors, lidar sensors, radar sensors, time-of-flight sensors, sonar sensors, global positioning system sensors, internal sensors, and/or any combination of these. The stored perception data can additionally or alternatively include classification data including semantic classifications of objects (e.g., pedestrians, vehicles, buildings, road surfaces, etc.) represented in the sensor data. The stored perception data can additionally or alternatively include track data (positions, orientations, sensor features, etc.) corresponding to motion of objects classified as dynamic objects through the environment. The track data can include multiple tracks of multiple different objects over time. This track data can be mined to identify images of certain types of objects (e.g., pedestrians, animals, etc.) at times when the object is stationary (e.g., standing still) or moving (e.g., walking, running, etc.). In this example, the computing device determines a track corresponding to a pedestrian.

In some examples, the vehicle component condition detector 522 can provide processed sensor data that indicates a condition of one or more vehicle components that corresponds with the condition of one or more vehicle components as described in FIG. 2 as well throughout this disclosure.

The localization component 524 can include functionality to receive data from the sensor system(s) 506 and/or other components to determine a position of the vehicle 502. For example, the localization component 524 can include and/or request/receive a three-dimensional map of an environment and can continuously determine a location of the autonomous vehicle within the map. In some instances, the localization component 524 can use SLAM (simultaneous localization and mapping) or CLAMS (calibration, localization and mapping, simultaneously) to receive time-of-flight data, image data, lidar data, radar data, sonar data, IMU data, GPS data, wheel encoder data, or any combination thereof, or the like to accurately determine a location of the autonomous vehicle. In some instances, the localization component 524 can provide data to various components of the vehicle 502 to determine an initial position of an autonomous vehicle for generating a trajectory, as discussed herein.

Further, the localization component 524 can receive map data representing semantic objects and can receive detections of such semantic objects in sensor data for determining a location of the vehicle 502, as discussed herein.

The prediction component 526 can generate one or more probability maps representing prediction probabilities of possible locations of one or more objects in an environment. For example, the prediction component 526 can generate one or more probability maps for vehicles, pedestrians, animals, or the like within a threshold distance from the vehicle 502. In some instances, the prediction component 526 can measure a track of an object and generate a discretized prediction probability map, a heat map, a probability distribution, a discretized probability distribution, and/or a trajectory for the object based on observed and predicted behavior. In some instances, the one or more probability maps can represent an intent of the one or more objects in the environment.

The planning component 528 can determine a path for the vehicle 502 to follow to traverse through an environment. For example, the planning component 528 can determine various routes and paths and various levels of detail. In some instances, the planning component 528 can determine a route to travel from a first location (e.g., a current location) to a second location (e.g., a target location). For the purpose of this discussion, a route can be a sequence of waypoints for traveling between two locations. As non-limiting examples, waypoints include streets, intersections, global positioning system (GPS) coordinates, etc. Further, the planning component 528 can generate an instruction for guiding the autonomous vehicle along at least a portion of the route from the first location to the second location. In at least one example, the planning component 528 can determine how to guide the autonomous vehicle from a first waypoint in the sequence of waypoints to a second waypoint in the sequence of waypoints. In some examples, the instruction can be a path, or a portion of a path. In some examples, multiple paths can be substantially simultaneously generated (i.e., within technical tolerances) in accordance with a receding horizon technique. A single path of the multiple paths in a receding data horizon having the highest confidence level may be selected to operate the vehicle.

In other examples, the planning component 528 can alternatively, or additionally, use data from the perception component 520 and/or the prediction component 526 to determine a path for the vehicle 502 to follow to traverse through an environment. For example, the planning component 528 can receive data from the perception component 520 and/or the prediction component 526 regarding objects associated with an environment. Using this data, the planning component 528 can determine a route to travel from a first location (e.g., a current location) to a second location (e.g., a target location) to avoid objects in an environment. In at least some examples, such a planning component 528 may determine there is no such collision free path and, in turn, provide a path which brings vehicle 502 to a safe stop avoiding all collisions and/or otherwise mitigating damage.

The planning component 528 can include vehicle configuration component 530. Vehicle configuration component 530 can include one or more vehicle configuration that corresponds with the one or more vehicle configuration described in FIG. 2 as well as throughout this disclosure.

The memory 518 can further include one or more maps 532 that can be used by the vehicle 502 to navigate within the environment. For the purpose of this discussion, a map can be any number of data structures modeled in two dimensions, three dimensions, or N-dimensions that are capable of providing information about an environment, such as, but not limited to, topologies (such as intersections), streets, mountain ranges, roads, terrain, and the environment in general. A map can further include an object identifier, an object classification, a three-dimensional location, covariance data (e.g., represented in image data or a multi-resolution voxel space), or the like. In some instances, a map can include, but is not limited to: texture information (e.g., color information (e.g., RGB color information, Lab color information, HSV/HSL color information), or the like), intensity information (e.g., LIDAR information, RADAR information, or the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, or the like). In one example, a map can include a three-dimensional mesh of the environment. In some instances, the map can be stored in a tiled format, such that individual tiles of the map represent a discrete portion of an environment, and can be loaded into working memory as needed, as discussed herein. In at least one example, the one or more maps 532 can include at least one map (e.g., images and/or a mesh). In some examples, the vehicle 502 can be controlled based at least in part on the map(s) 538. That is, the map(s) 532 can be used in connection with the perception component 520 (and sub-components), the localization component 524 (and sub-components), the prediction component 526, and/or the planning component 528 to determine a location of the vehicle 502, identify objects in an environment, generate prediction probabilit(ies) associated with objects and/or the vehicle 502, and/or generate routes and/or trajectories to navigate within an environment.

In at least one example, the computing device 504 can include one or more system controller(s) 534, which can be configured to control steering, propulsion, braking, safety, emitters, communication, and other systems of the vehicle 502. These system controller(s) 534 can communicate with and/or control corresponding systems of the drive system(s) 514 and/or other components of the vehicle 502, which may be configured to operate in accordance with a path provided from the planning component 528.

In at least one example, one or more system controller(s) 534 can include vehicle configuration 536. Vehicle configuration 536 can correspond with the one or more vehicle configuration described in FIG. 2 as well as throughout this disclosure.

The vehicle 502 can connect to external device(s) 540 via network 538 and can include one or more processor(s) 542 and memory 546 communicatively coupled with the one or more processor(s) 542. In at least one instance, the one or more processor(s) 542 can be similar to the processor(s) 516 and the memory 546 can be similar to the memory 518. In the illustrated example, the memory 546 of the computing device(s) 540 stores vehicle component data 548. Vehicle component data may include, but is not limited to, data indicative of a condition of one or more vehicle component, reference data of the one or more vehicle component indicative of a new condition of the vehicle component, threshold data indicative of various thresholds that vehicle 502 may compare the condition of the vehicle component to when determining the vehicle configuration. Sources of vehicle component data may be from, but not limited to, sensor system(s) 506, sensor data aggregated from another vehicle, sensor data aggregated from a fleet of vehicles, and/or environmental data from external sources as discussed herein.

The processor(s) 516 of the computing device 504 and the processor(s) 542 of the computing device(s) 540 can be any suitable processor capable of executing instructions to process data and perform operations as described herein. By way of example and not limitation, the processor(s) 516 and 542 can comprise one or more Central Processing Units (CPUs), Graphics Processing Units (GPUs), or any other device or portion of a device that processes electronic data to transform that electronic data into other electronic data that can be stored in registers and/or memory. In some examples, integrated circuits (e.g., ASICs, etc.), gate arrays (e.g., FPGAs, etc.), and other hardware devices can also be considered processors in so far as they are configured to implement encoded instructions.

The memory 518 computing device 504 and the memory 546 of the computing device(s) 540 are examples of non-transitory computer-readable media. The memory 518 and 546 can store an operating system and one or more software applications, instructions, programs, and/or data to implement the methods described herein and the functions attributed to the various systems. In various implementations, the memory 518 and 546 can be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying Figures are merely examples that are related to the discussion herein.

In some instances, aspects of some or all of the components discussed herein can include any models, algorithms, and/or machine-learning algorithms. For example, in some instances, the components in the memory 518 and 546 can be implemented as a neural network.

In some examples, the neural network can train a machine learned model that can determine a condition of one or more vehicle components such as a condition of a tire. The neural network can receive a reference data set of images of tires labeled with new tire conditions and training data sets of images of tires labeled based on one or more tire conditions. The training data sets can include images of tires at different types of tire conditions and a different wear levels of each particular tire condition. In some examples, the label may be tread depth. The images may be indicative of different levels of wear of the tire such each with different level of tread depths that are indicative of gradual wear of the tire. In some examples, the label may be distance traveled by the tire. In some examples, the label may be other types of tire wear such as puncture, uneven wear, and/or mis-alignment of tire. In some examples, vehicle 502 can determine the condition of the tire based on the machine learned model. In some examples, the neural network can train machine learned models to determine wear levels of different conditions of other vehicle components (e.g., motor, brakes, suspensions, drivetrain, joints, sensors, and/or the like).

As described herein, an exemplary neural network is an algorithm that passes input data through a series of connected layers to produce an output. Each layer in a neural network can also comprise another neural network, or can comprise any number of layers (whether convolutional or not). As can be understood in the context of this disclosure, a neural network can utilize machine learning, which can refer to a broad class of such algorithms in which an output is generated based on learned parameters.

Although discussed in the context of neural networks, any type of machine learning can be used consistent with this disclosure. For example, machine learning or machine-learned algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc.

Additional examples of architectures include neural networks such as ResNet50, ResNet101, VGG, DenseNet, PointNet, or the like.

Figure 6:
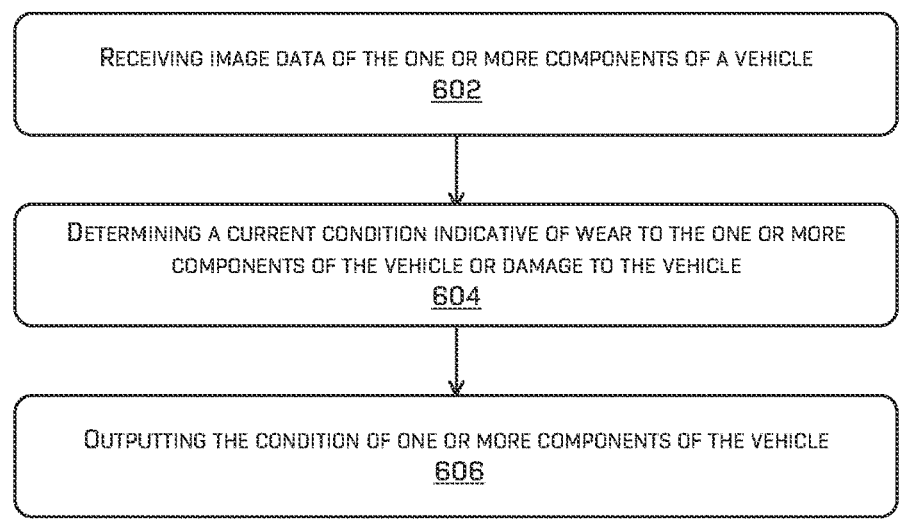
FIG. 6 is an example process for determining vehicle component condition based on image data.

FIGS. 1 and 6 illustrate example processes in accordance with examples of the disclosure. These processes are illustrated as a logical flow graph, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, or the like that perform particular functions or implement particular abstract data types. The order in which the operations are described is not intended to be construed as a limitation, and any number of the described operations can be omitted or combined in any order and/or in parallel to implement the processes.

FIG. 6 is an example process 600 for determining a vehicle configuration based on a condition of one or more vehicle component. For example, some or all of the process 600 can be performed by one or more components in FIG. 5, as described herein. For example, some or all of the process 600 can be performed by the perception component 520, the planning component 528, and/or the system controllers 534.

At operation 602, the process can include receiving image data of one or more component of the vehicle from one or more image sensor. Additional details associated with operation 602 are discussed in connection with FIGS. 2-4, as well as throughout this disclosure.

At operation 604, the process can include determine a current condition of the one or more components based on the image data. The current condition may be indicative of wear to the one or more components or damage to the vehicle. In some examples, the current condition may be determined by applying the image data to a machine learned model. In some examples, the current condition may be determined through other techniques. Additional details associated with operation 604 are discussed in connection with FIGS. 2-4, as well as throughout this disclosure.

At operation 606, the process can outputting the condition of one or more components of the vehicle. In some examples, the condition may be outputted to the vehicle from a remote computing device (e.g., from a charging facility or a maintenance facility). In some example, the condition may be outputted to a fleet management computing device from the vehicle or the remote computing device. Additional details associated with operation 606 are discussed in connection with FIGS. 2-4, as well as throughout this disclosure.

Example Clauses

A: A system comprising: a charging component to charge a vehicle; an image sensor disposed proximate to the charging component; one or more processors; and one or more non-transitory computer-readable media storing computer-executable instructions that, when executed, cause the one or more processors to perform operations comprising: receiving, from the image sensor, image data of a current condition of a component of the vehicle; inputting the image data to a machine learned model trained to determine component condition based at least in part on the image data; receiving, from the machine learned model, an indication of the current condition of the component; and outputting the current condition of the component to at least one of the vehicle or a fleet management computing device.

B: The system of paragraph A, further comprising determining, based at least in part on the current condition, vehicle configuration data, wherein the vehicle configuration data comprises at least one of: an instruction to navigate to a maintenance facility; an instruction to remove the vehicle from service; an estimated stopping distance; an instruction limiting a maximum operational speed of the vehicle; an instruction limiting a movement range of the vehicle; or an instruction to change the component of the vehicle; and outputting the vehicle configuration data to the vehicle for use in controlling the vehicle.

C: The system of paragraph A or B, wherein the vehicle configuration data comprises a route to the maintenance facility, the operations further comprising: receiving a wear threshold; receiving map data; determining, based at least in part on the condition exceeding the wear threshold and the map data, a location of the maintenance facility; and determining, based at least in part on the location of the maintenance facility, the route to the maintenance facility.

D: The system of any of paragraphs A-C, wherein the vehicle configuration data comprises a stopping distance, the operations further comprising: receiving a wear threshold; determining, based on at least in part on the condition being less than the wear threshold, a first stopping distance or, based at least in part on the condition exceeding the wear threshold, a second stopping distance longer than the first stopping distance.

E: The system of any of paragraphs A-D, wherein the vehicle configuration data comprises the movement range, the operations further comprising: receiving map data receiving a wear threshold; determining, based at least on the condition exceeds the wear threshold and the map data, movement range of the autonomous vehicle less than a total movement range of the autonomous vehicle.

F: The system of any of paragraphs A-E, the operations further comprising: determining that the vehicle is positioned to receive charge from the charging component; and at least one of: instructing the vehicle to move the component of the vehicle prior to or concurrently with receiving the image data of the current condition of the component of the vehicle; or moving, by a manipulator of the system, the component of the vehicle prior to or concurrently with receiving the image data of the current condition of the component of the vehicle.

G: The system of any of paragraphs A-F, the operations further comprising: prior to receiving the image data, receiving from the vehicle an instruction to inspect the component of the vehicle.

H: The system of any of paragraphs A-G, wherein the component is a tire; and wherein the image sensor is positioned so to capture a tread surface of the tire.

I: A method comprising: receiving, from an image sensor, image data of a component of a vehicle; determining, based at least in part on the image data, an indication of a current condition of the component, wherein the current condition is indicative of a wear to the component or damage to the vehicle; and outputting the current condition of the component.

J: The method of paragraph I, further comprising: determining, based at least in part on the current condition, vehicle configuration data, wherein the vehicle configuration data comprises at least one of: an instruction to navigate to a maintenance facility; an instruction to remove the vehicle from service; an estimated stopping distance; an instruction limiting a maximum operational speed of the vehicle; an instruction limiting a movement range of the vehicle; or an instruction to change the component of the vehicle; and outputting the vehicle configuration data to the vehicle for use in controlling the vehicle.

K: The method of paragraph I or J, wherein the component comprises a tire.

L: The method of paragraph K, wherein the image sensor is disposed at a charging or maintenance facility and is positioned to capture a surface of the tire as the vehicle moves relative to the charging or maintenance facility, the method further comprising: outputting the indication of the current condition to at least one of the vehicle or a fleet management computing device.

M: The method of paragraph K or L, wherein the image sensor is coupled to the vehicle at a location to capture a tread surface of the tire as it rotates.

N: The method of any of paragraphs K-M, further comprising: controlling a position of the image sensor to capture the image data from multiple locations relative to the component of the vehicle.

O: The method of any of paragraphs K-N, further comprising: illuminating, using a light source, light across a tread surface of the tire, wherein the image data is captured concurrently with the illumination; and wherein the current condition of the component comprises a tread depth of the tire.

P: The method of any of paragraphs K-O, further comprising: receiving, from a second sensor, second sensor data associated with the current condition or another condition of the tire, the second sensor comprising at least one of: a laser rangefinder; a time of flight sensor; or a physical measurement sensor.

Q: The method of any of paragraphs I-P, further comprising: inputting the image data to a machine learned model trained to determine the current condition of the component based at least in part on the image data; determining, based at least in part on the machine learned model, the indication of the current condition of the component.

R: The method of any of paragraphs I-Q, wherein the component comprises at least one of: a brake system component; a drivetrain component; a suspension component; a motor component; a bushing; or a battery system component.

S: One or more non-transitory computer-readable media storing instructions executable by a processor, wherein the instructions, when executed, cause the processor to perform operations comprising: receiving, from an image sensor, image data of a component of a vehicle; determining, based at least in part on the image data, an indication of a current condition of the component, wherein the current condition is indicative of a wear to the component or damage to the vehicle; and outputting the current condition of the components.

T: The one or more non-transitory computer-readable media of paragraph S, wherein the operations further comprising: determining, based at least in part on the current condition, vehicle configuration data, wherein the vehicle configuration data comprises at least one of: an instruction to navigate to a maintenance facility; an instruction to remove the vehicle from service; an estimated stopping distance; an instruction limiting a maximum operational speed of the vehicle; an instruction limiting a movement range of the vehicle; an instruction to change the component of the vehicle; and outputting the vehicle configuration data to the vehicle for use in controlling the vehicle.

U: The one or more non-transitory computer-readable media of paragraph S or T, wherein the component comprises a tire.

V: The one or more non-transitory computer-readable media of paragraph U, the operations further comprising: illuminating, using a light source, light across a tread surface of the tire, wherein the image data is captured concurrently with the illumination; and wherein the current condition of the component comprises a tread depth of the tire.

W: The one or more non-transitory computer-readable media of any of paragraphs S-V, the operations further comprising: inputting the image data to a machine learned model trained to determine the current condition of the component based at least in part on the image data; determining, based at least in part on the machine learned model, the indication of the current condition of the vehicle.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A system comprising:
   a charging component to charge a vehicle;
   an image sensor disposed proximate to the charging component;
   one or more processors; and
   one or more non-transitory computer-readable media storing computer-executable instructions that, when executed, cause the one or more processors to perform operations comprising:
   receiving, from the image sensor, image data of a current condition of a component of the vehicle;
   inputting the image data to a machine learned model trained to determine component condition based at least in part on the image data;
   receiving, from the machine learned model, an indication of the current condition of the component;
   determining, based at least in part on the current condition, vehicle configuration data;
   outputting the current condition of the component to at least one of the vehicle or a fleet management computing device; and
   outputting the vehicle configuration data to the vehicle to adjust an autonomous driving function of the vehicle.

2. The system of claim 1, wherein the vehicle configuration data comprises at least one of:
   an instruction to navigate to a maintenance facility;
   an instruction to remove the vehicle from service;

an estimated stopping distance;
an instruction limiting a maximum operational speed of the vehicle;
an instruction limiting a movement range of the vehicle; or
an instruction to change the component of the vehicle.

3. The system of claim 1, the operations further comprising:
determining that the vehicle is positioned to receive charge from the charging component; and
at least one of:
instructing the vehicle to move the component of the vehicle prior to or concurrently with receiving the image data of the current condition of the component of the vehicle; or
moving, by a manipulator of the system, the component of the vehicle prior to or concurrently with receiving the image data of the current condition of the component of the vehicle.

4. The system of claim 1, the operations further comprising:
prior to receiving the image data, receiving from the vehicle an instruction to inspect the component of the vehicle.

5. The system of claim 1, wherein the component is a tire; and
wherein the image sensor is positioned so to capture a tread surface of the tire.

6. A method comprising:
receiving, from an image sensor, image data of a component of a vehicle;
determining, based at least in part on the image data, an indication of a current condition of the component, wherein the current condition is indicative of a wear to the component or damage to the vehicle;
determining, based at least in part on the current condition, vehicle configuration data;
outputting the current condition of the component; and
outputting the vehicle configuration data to the vehicle to adjust an autonomous driving function of the vehicle.

7. The method of claim 6, further comprising:
wherein the vehicle configuration data comprises at least one of:
an instruction to navigate to a maintenance facility;
an instruction to remove the vehicle from service;
an estimated stopping distance;
an instruction limiting a maximum operational speed of the vehicle;
an instruction limiting a movement range of the vehicle; or
an instruction to change the component of the vehicle.

8. The method of claim 6, wherein the component comprises a tire.

9. The method of claim 8, wherein the image sensor is disposed at a charging or maintenance facility and is positioned to capture a surface of the tire as the vehicle moves relative to the charging or maintenance facility, the method further comprising:
outputting the indication of the current condition to at least one of the vehicle or a fleet management computing device.

10. The method of claim 8, wherein the image sensor is coupled to the vehicle at a location to capture a tread surface of the tire as it rotates.

11. The method of claim 8, further comprising:
controlling a position of the image sensor to capture the image data from multiple locations relative to the component of the vehicle.

12. The method of claim 8, further comprising:
illuminating, using a light source, light across a tread surface of the tire,
wherein the image data is captured concurrently with the illumination; and
wherein the current condition of the component comprises a tread depth of the tire.

13. The method of claim 8, further comprising:
receiving, from a second sensor, second sensor data associated with the current condition or another condition of the tire, the second sensor comprising at least one of:
a laser rangefinder;
a time of flight sensor; or
a physical measurement sensor.

14. The method of claim 6, further comprising:
inputting the image data to a machine learned model trained to determine the current condition of the component based at least in part on the image data;
determining, based at least in part on the machine learned model, the indication of the current condition of the component.

15. The method of claim 6, wherein the component comprises at least one of:
a brake system component;
a drivetrain component;
a suspension component;
a motor component;
a bushing; or
a battery system component.

16. One or more non-transitory computer-readable media storing instructions executable by a processor, wherein the instructions, when executed, cause the processor to perform operations comprising:
receiving, from an image sensor, image data of a component of a vehicle;
determining, based at least in part on the image data, an indication of a current condition of the component, wherein the current condition is indicative of a wear to the component or damage to the vehicle;
determining, based at least in part on the current condition, vehicle configuration data;
outputting the current condition of the component; and
outputting the vehicle configuration data to the vehicle to adjust an autonomous driving function of the vehicle.

17. The one or more non-transitory computer-readable media of claim 16,
wherein the vehicle configuration data comprises at least one of:
an instruction to navigate to a maintenance facility;
an instruction to remove the vehicle from service;
an estimated stopping distance;
an instruction limiting a maximum operational speed of the vehicle;
an instruction limiting a movement range of the vehicle;
an instruction to change the component of the vehicle.

18. The one or more non-transitory computer-readable media of claim 16, wherein the component comprises a tire.

19. The one or more non-transitory computer-readable media of claim 18, the operations further comprising:
illuminating, using a light source, light across a tread surface of the tire, wherein the image data is captured concurrently with the illumination; and wherein the current condition of the component comprises a tread depth of the tire.

20. The one or more non-transitory computer-readable media of claim 16, the operations further comprising:

inputting the image data to a machine learned model trained to determine the current condition of the component based at least in part on the image data;

determining, based at least in part on the machine learned model, the indication of the current condition of the vehicle.

\* \* \* \* \*